United States Patent
Muron et al.

(10) Patent No.: US 9,416,668 B2
(45) Date of Patent: Aug. 16, 2016

(54) HOLLOW FAN BLADED WITH BRAIDED FABRIC TUBES

(75) Inventors: Stephen P. Muron, Columbia, CT (US); Larry Foster, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1060 days.

(21) Appl. No.: 13/459,676

(22) Filed: Apr. 30, 2012

(65) Prior Publication Data

US 2013/0283820 A1 Oct. 31, 2013

(51) Int. Cl.
| | |
|---|---|
| F01D 5/14 | (2006.01) |
| F01D 5/28 | (2006.01) |
| F04D 29/02 | (2006.01) |
| F04D 29/32 | (2006.01) |
| F04D 29/38 | (2006.01) |
| F02K 3/06 | (2006.01) |

(52) U.S. Cl.
CPC ............... *F01D 5/282* (2013.01); *F01D 5/147* (2013.01); *F02K 3/06* (2013.01); *F04D 29/023* (2013.01); *F04D 29/324* (2013.01); *F04D 29/388* (2013.01); *F05D 2220/36* (2013.01); *F05D 2300/6012* (2013.01); *F05D 2300/612* (2013.01); *F05D 2300/614* (2013.01)

(58) Field of Classification Search
CPC ............ F01D 5/14; F01D 5/147; F01D 5/16; F01D 5/28; F01D 5/282; F05D 2300/612; F05D 2300/614
See application file for complete search history.

(56) References Cited

U.S. PATENT DOCUMENTS

| 3,004,607 | A | | 10/1961 | Linnaberry et al. |
|---|---|---|---|---|
| 3,623,204 | A | * | 11/1971 | Wagle ................. B21D 26/055 228/182 |
| 3,637,325 | A | * | 1/1972 | Morley ......................... 416/230 |
| 4,301,584 | A | * | 11/1981 | Dillner et al. .............. 29/889.71 |
| 4,784,575 | A | | 11/1988 | Nelson et al. |
| 5,013,216 | A | | 5/1991 | Bailey et al. |
| 5,018,271 | A | | 5/1991 | Bailey et al. |
| 5,127,802 | A | * | 7/1992 | Carlson .................. B29C 44/18 298/889.71 |
| 5,129,787 | A | * | 7/1992 | Violette et al. ................ 416/226 |

(Continued)

FOREIGN PATENT DOCUMENTS

| EP | 1935532 A1 | 6/2008 |
|---|---|---|
| EP | 2159374 A2 | 3/2010 |

(Continued)

OTHER PUBLICATIONS

International Preliminary Report on Patentability for International Application No. PCT/US2013/038564 mailed on Nov. 13, 2014.

(Continued)

*Primary Examiner* — Igor Kershteyn
*Assistant Examiner* — Christopher R Legendre
(74) *Attorney, Agent, or Firm* — Carlson, Gaskey & Olds, PC

(57) ABSTRACT

A fan blade having a body with a dovetail and an airfoil extending radially outwardly. The airfoil includes a pair of skins spaced to form an internal core, which define a pressure side and a suction side, and extending from a radially inner end to a radially outer tip. The core receives a plurality of braided tubes, with the tubes extending with at least a component in a radially outward direction. A fan and an engine are also described.

17 Claims, 2 Drawing Sheets

(56) References Cited

U.S. PATENT DOCUMENTS

| | | | |
|---|---|---|---|
| 5,403,153 A | 4/1995 | Goetze | |
| 5,791,879 A * | 8/1998 | Fitzgerald et al. | 416/229 A |
| 7,165,945 B2 | 1/2007 | Kovalsky et al. | |
| 7,694,505 B2 * | 4/2010 | Schilling | F02C 7/36 60/226.1 |
| 7,837,446 B2 | 11/2010 | McMillan | |
| 8,038,408 B2 * | 10/2011 | McMillan | 416/230 |
| 8,083,489 B2 | 12/2011 | Viens et al. | |
| 8,529,720 B2 * | 9/2013 | Goldfinch | B21D 26/055 156/182 |
| 9,149,997 B2 * | 10/2015 | Foster | F04D 29/023 |
| 2006/0280606 A1 | 12/2006 | Busbey et al. | |
| 2007/0243070 A1 * | 10/2007 | Matheny | F01D 5/147 416/230 |
| 2008/0014095 A1 | 1/2008 | Moniz et al. | |
| 2008/0152858 A1 * | 6/2008 | Schreiber | 428/68 |
| 2010/0080710 A1 * | 4/2010 | Schreiber | 416/223 R |
| 2011/0293435 A1 | 12/2011 | McMillan | |
| 2015/0292340 A1 * | 10/2015 | Kawanishi | C04B 35/80 416/215 |

FOREIGN PATENT DOCUMENTS

| | | |
|---|---|---|
| GB | 756673 | 9/1956 |
| GB | 2462102 A | 1/2010 |
| WO | 9221515 A1 | 12/1992 |
| WO | 9308017 A1 | 4/1993 |

OTHER PUBLICATIONS

International Search Report and Written Opinion for International Application No. PCT/US2013l/038564 completed on Sep. 25, 2013.
European Search Report for European Application No. 13785135.8 mailed May 1, 2015.
Singapore Search Report for Singapore Patent Application No. 11201406234X mailed Sep. 18, 2015.

* cited by examiner

HOLLOW FAN BLADED WITH BRAIDED FABRIC TUBES

BACKGROUND OF THE INVENTION

This application relates to a hollow fan blade for a gas turbine engine, wherein a unique structure is provided in the core of the blade.

Gas turbine engines are known, and typically include a fan moving air, with part of the air going into a compressor in the core of the engine, and the rest of the air bypassing the core. From the compressor the air passes into a combustion section where it is mixed with fuel and ignited. Products of this combustion pass downstream over turbine rotors, driving them to rotate.

Historically, the fan has rotated at the same speed as a turbine rotor. More recently, a gear reduction is provided to drive the fan at a slower speed than the rotor.

The use of the gear reduction has allowed the fans to become larger in diameter. The fan rotor blades should be lightweight, despite the increasing size. In addition, there are requirements that a fan blade be relatively strong, as it must be able to survive certain levels of impact from foreign objects. As an example, birds may sometimes impact a fan blade in a gas turbine engine, and the blades must survive the impact.

Fan blades designs utilizing hollow constructions have recently been considered.

SUMMARY OF THE INVENTION

In a featured embodiment, a component has a body with a dovetail and an airfoil extending outwardly from the dovetail. The airfoil is formed by a pair of skins spaced to form an internal core. The skins define a pressure side and a suction side, and extend from an inner end to an outer tip. The core receives a plurality of braided tubes, which extend with at least a component in a radially outward direction.

In a further embodiment according to the previous embodiment, the tubes are braided from a fiber material.

In a further embodiment according to any of the previous embodiments, the fiber material is one or more of carbon fiber, fiberglass or Kevlar™.

In a further embodiment according to any of the previous embodiments, the plurality of braided tubes are connected.

In a further embodiment according to any of the previous embodiments, the plurality of braided tubes are at least partially filled with a foam.

In a further embodiment according to any of the previous embodiments, the tubes taper to a point at an inner end.

In a further embodiment according to any of the previous embodiments, the dovetail has an upwardly extending portion that extends upwardly into a radially inner end of the braided tubes.

In another featured embodiment, a fan has a rotor carrying a plurality of fan blades. Each fan blade includes a body having a dovetail and an airfoil extending outwardly from the dovetail. The airfoil is formed by a pair of skins spaced to form an internal core. The skins define a pressure side and a suction side, and extend from an inner end to an outer tip. The core receives a plurality of braided tubes, which extend with at least a component in a radially outward direction.

In a further embodiment according to the previous embodiment, the tubes are braided from a fiber material.

In a further embodiment according to any of the previous embodiments, the fiber material is one or more of carbon fiber, fiberglass or Kevlar™.

In a further embodiment according to any of the previous embodiments, the plurality of braided tubes are connected together.

In a further embodiment according to any of the previous embodiments, the plurality of braided tubes are at least partially filled with a foam.

In a further embodiment according to any of the previous embodiments, the tubes taper to a point at a radially inner end.

In a further embodiment according to any of the previous embodiments, the dovetail has an upwardly extending portion that extends upwardly into a radially inner end of the braided tubes.

In another featured embodiment, a gas turbine engine has a fan, a compressor, a combustor, and a turbine section. The turbine is configured to drive the fan through a gear reduction. The fan includes a rotor carrying a plurality of fan blades. Each fan blade includes a body having a dovetail and an airfoil extending radially outwardly from the dovetail. The airfoil is formed by a pair of skins spaced to form an internal core. The skins define a pressure side and a suction side, and extend from a radially inner end to a radially outer tip. The core receives a plurality of braided tubes, which extend with at least a component in a radially outward direction.

In a further embodiment according to the previous embodiment, the tubes are braided from a fiber material.

In a further embodiment according to any of the previous embodiments, the fiber material is one or more of carbon fiber, fiberglass or Kevlar™.

In a further embodiment according to any of the previous embodiments, the plurality of braided tubes are at least partially filled with a foam.

These and other features of this application will be best understood from the following specification and drawings, the following of which is a brief description.

DETAILED DESCRIPTION

Figure 1:
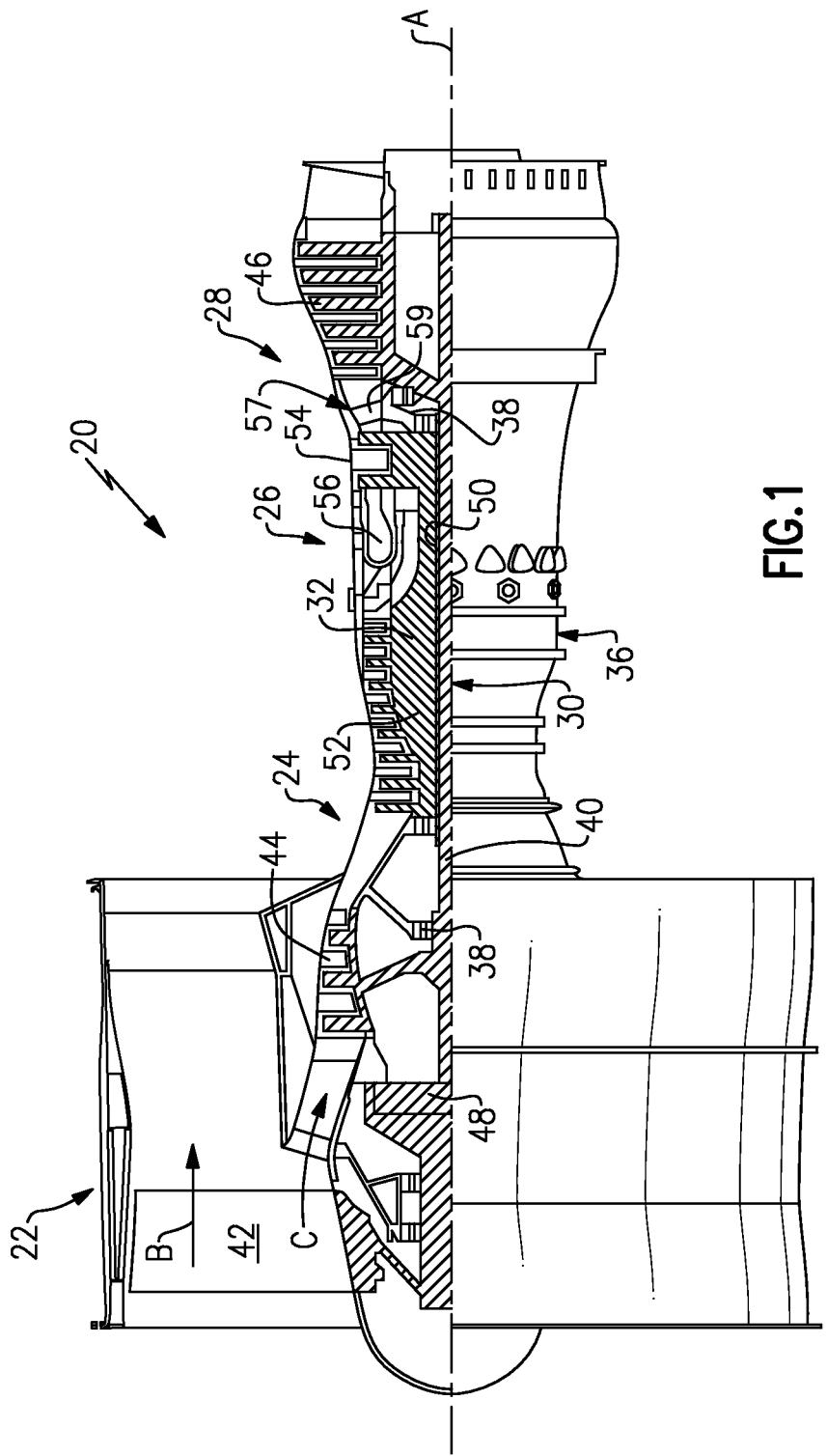
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. An optional mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

To achieve the high bypass ratios, the fan blades are becoming increasingly larger. One way to achieve larger fan blades, yet maintain an acceptable weight, is to provide a hollow construction.

Figure 2:
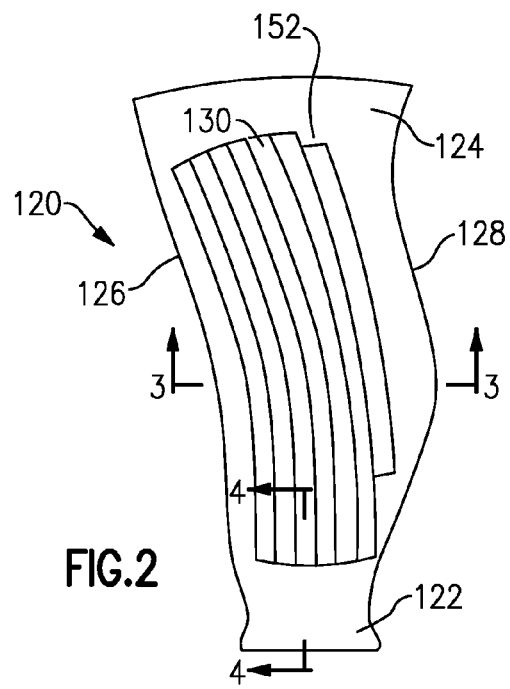
FIG. 2 shows a fan blade.

A fan blade 120 with a hollow construction is illustrated in FIG. 2.

A dovetail 122 of the fan blade is to be received in a rotor that allows the fan blade to rotate. A outer tip 124 will be positioned radially outwardly of the dovetail 122 when the blade 120 is mounted in a rotor. The fan blade 120 extends from a leading edge 126 to a trailing edge 128, and has an airfoil shape 152 extending radially outwardly from the dovetail 122.

A plurality of braided tubes 130 extend generally in a radially outward direction. The braided tubes 130 are actually within a body of the fan blade 120, as will be appreciated from FIG. 3. However, they are illustrated such that the presence of the braided tubes can be seen. In addition, at the leading edge 126, and the trailing edge 128, there may be sheathes to connect the outer skins 132 and 134 (see FIG. 3), and enclose the hollow internal core. Of course, the tubes 130 need not extend directly radially outwardly, however, in FIG. 2, they extend in a direction with a significant radial component.

Figure 3:
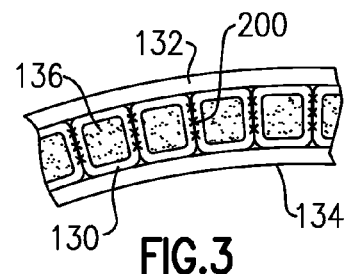
FIG. 3 is a cross-sectional view along line 3-3.

FIG. 3 is a cross-sectional view, and shows the tubes 130 positioned between skin layers 132 and 134. Skin layer 132 is a suction side, and skin layer 134 defines a pressure side of the fan blade 120. The skin layers 132 and 134 may be formed of an appropriate metal, such as an aluminum. The tubes 130 are formed of braided fiber fabric. Examples of fibers may be carbon fiber, Kevlar® is a registered trademark of Dupont Corporation, and could be generically called a para-aramid synthetic fiber.

The tubes 130 may be provided with an internal foam 136, although that is optional. The foam 136 may be deposited partly or completely within the tubes 130 to provide additional rigidity. The tubes form structural ribs between the skin layers 132 and 134, and the fibers reinforce the fan blade.

As known, the tubes 130 may be braided about a mandrel, and the mandrel may later be "washed out" or otherwise removed, leaving the hollow tube. The braided tubes may be impregnated with an appropriate material to form a more rigid component. As an example the braided tubes may be infused with resin, for example by resin transfer molding, in situ and integral with the entire blade, trapping any foam or mandrel shaping material inside.

Some or all of the tubes 130 may be stitched together as shown schematically at 200. Stitching the tubes together can provide additional rigidity.

Figure 4A:
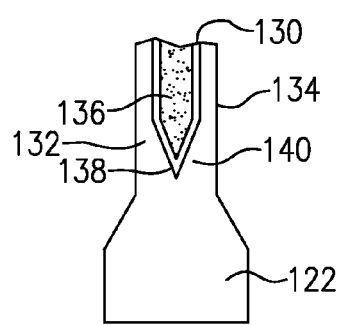
FIG. 4A is a cross-sectional view of a first embodiment along line 4-4.

FIG. 4A shows the radially inner portion of the blade. As is clear, the tubes 130 may have a radially inner end 138 that tapers to a point 138. In this embodiment, the skins 132/134 will increase in thickness as shown in 140 to fill up the internal space.

Figure 4B:
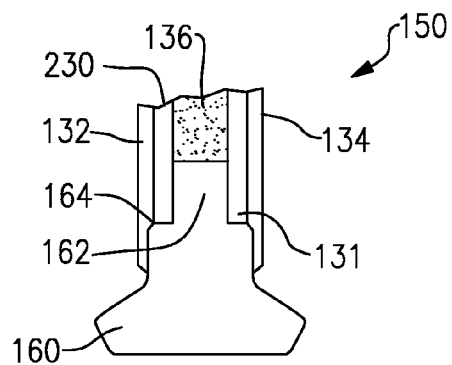
FIG. 4B shows a second embodiment, also along line 4-4.

FIG. 4B shows an alternative embodiment 150 wherein the dovetail 160 has an upwardly extending portion 162 that fits upwardly into the lower end 131 of a tube 230. In this embodiment, the skins 132 and 134 sit outwardly of the tube, and extends radially beyond the radially inner end 164 of the tube 230. As shown, the tube 230 bottoms out on a ledge 164 of the dovetail 160.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A component comprising:
   a body having a dovetail and an airfoil extending outwardly from said dovetail;
   said airfoil formed by a pair of skins spaced to form an internal core, and said skins defining a pressure side and a suction side, and extending from an inner end to an outer tip;
   said core receiving a plurality of braided tubes, said tubes extending with at least a component in a radially outward direction;
   said plurality of braided tubes are connected; and
   said plurality of braided tubes are connected together by stitching.

2. The component as set forth in claim 1, wherein said tubes are braided from a fiber material.

3. The component as set forth in claim 2, wherein said fiber material is one or more of carbon fiber, fiberglass or para-aramid synthetic fiber.

4. The component as set forth in claim 3, wherein said plurality of braided tubes are at least partially filled with a foam.

5. The component as set forth in claim 1, wherein said plurality of braided tubes are at least partially filled with a foam.

6. The component as set forth in claim 1, wherein said tubes taper to a point at an inner end.

7. The component as set forth in claim 1, wherein said dovetail has an upwardly extending portion that extends upwardly into a radially inner end of said braided tubes.

8. A fan comprising:
   a rotor carrying a plurality of fan blades, each said fan blade including a body having a dovetail and an airfoil extending outwardly from said dovetail;
   said airfoil formed by a pair of skins spaced to form an internal core, and said skins defining a pressure side and a suction side, and extending from an inner end to an outer tip;
   said core receiving a plurality of braided tubes, said tubes extending with at least a component in a radially outward direction;
   said plurality of braided tubes are connected together; and
   a plurality of braided tubes are connected together by stitching.

9. The fan as set forth in claim 8, wherein said tubes are braided from a fiber material.

10. The fan as set forth in claim 9, wherein said fiber material is one or more of carbon fiber, fiberglass or para-aramid synthetic fiber.

11. The fan as set forth in claim 8, wherein said plurality of braided tubes are at least partially filled with a foam.

12. The fan as set forth in claim 8, wherein said tubes taper to a point at a radially inner end.

13. The fan as set forth in claim 8, wherein said dovetail has an upwardly extending portion that extends upwardly into a radially inner end of said braided tubes.

14. A gas turbine engine comprising:
   a fan, a compressor, a combustor, a turbine section, and said turbine being configured to drive said fan through a gear reduction, said fan including a rotor carrying a plurality of fan blades, each said fan blade including a body having a dovetail and an airfoil extending radially outwardly from said dovetail;
   said airfoil formed by a pair of skins spaced to form an internal core, and said skins defining a pressure side and a suction side, and extending from a radially inner end to a radially outer tip;
   said core receiving a plurality of braided tubes, said tubes extending with at least a component in a radially outward direction; and
   said tubes taper to a point at an inner end.

15. The engine as set forth in claim 14, wherein said tubes are braided from a fiber material.

16. The engine as set forth in claim 15, wherein said fiber material is one or more of carbon fiber, fiberglass or para-aramid synthetic fiber.

17. The engine as set forth in claim 14, wherein said plurality of braided tubes are at least partially filled with a foam.

* * * * *